J. KARITZKY.
CONDUIT OR CABLE CLAMP AND BRIDLE RING.
APPLICATION FILED OCT. 14, 1920.
1,381,199.
Patented June 14, 1921.
2 SHEETS—SHEET 1.
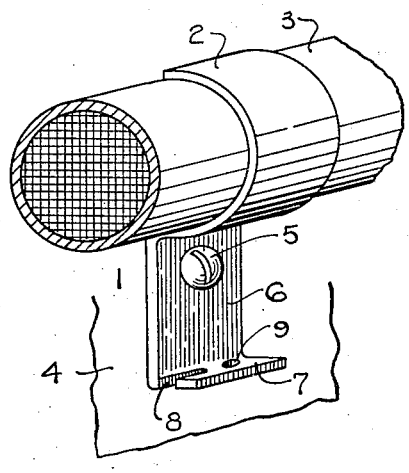
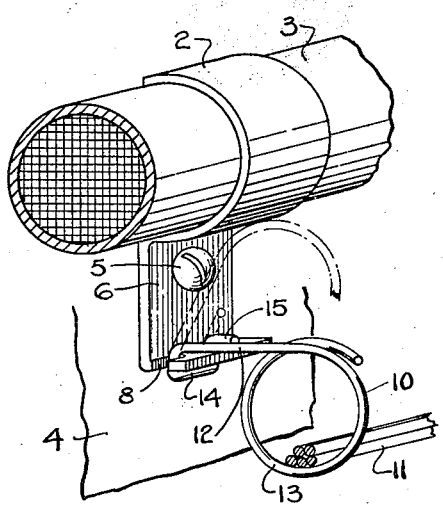
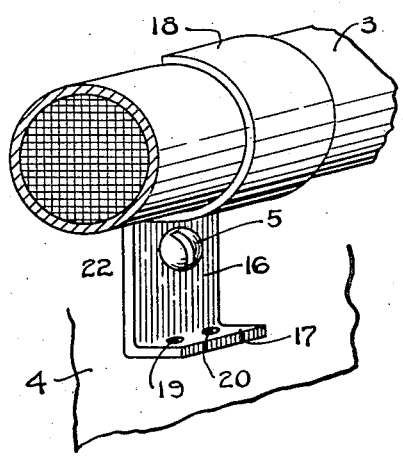
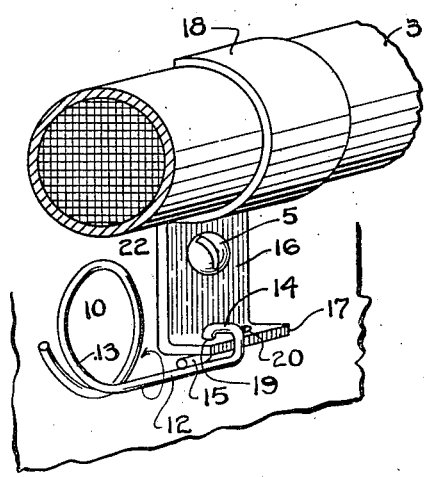
INVENTOR
John Karitzky
BY
Alanhn Johnson
ATTORNEY J. KARITZKY.
CONDUIT OR CABLE CLAMP AND BRIDLE RING.
APPLICATION FILED OCT. 14, 1920.

1,381,199.

Patented June 14, 1921.
2 SHEETS—SHEET 2.

INVENTOR
John Karitzky
BY
Alanson Johnson
ATTORNEY

UNITED STATES PATENT OFFICE.

JOHN KARITZKY, OF GARWOOD, NEW JERSEY, ASSIGNOR TO HENRY B. NEWHALL, EXECUTOR OF HENRY B. NEWHALL, SR., DECEASED.

CONDUIT OR CABLE CLAMP AND BRIDLE-RING.

1,381,199.      Specification of Letters Patent.    Patented June 14, 1921.

Application filed October 14, 1920. Serial No. 416,980.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a supporting member which is preferably, though not necessarily, in the form of an integral flange having a plurality of non-alined openings, and a bridle ring having a U-shaped hook adapted to be threaded through said openings in said supporting member or flange and bear both upon the upper and lower surfaces of said flange.

My invention further relates to such a conduit or cable clamp in which the supporting member or flange is provided with a slot open on the side and with a non-alined hole. This permits a little quicker and easier attachment of the bridle ring to the clamp than when the supporting member or flange has two non-alined holes with no slot.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown different embodiments of my invention, the same reference numerals refer to similar parts in the several figures.

Figure 1 is a perspective view of my conduit or cable clamp and of a cable which it supports;

Fig. 2 is a perspective view of the conduit or cable clamp shown in Fig. 1 with the addition of the bridle ring;

Fig. 3 is a perspective view of another form of my invention in which the supporting member or flange is provided with two holes rather than with a slot and a hole as shown in Figs. 1 and 2;

Fig. 4 is a perspective view, similar to Fig. 3, showing the first position of threading my bridle ring through the non-alined holes in the supporting member or flange;

Figure 5:
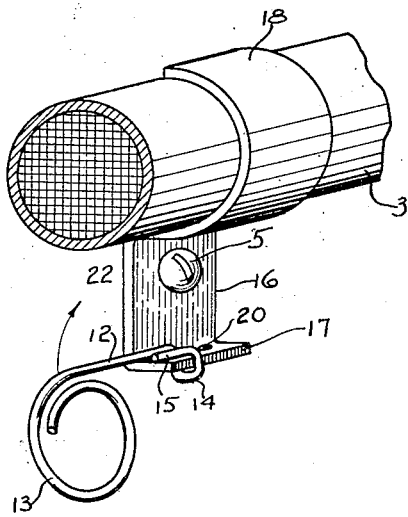
Fig. 5 is a perspective view, similar to Fig. 4, showing the second position of threading the bridle ring through the non-alined holes.
Figure 6:
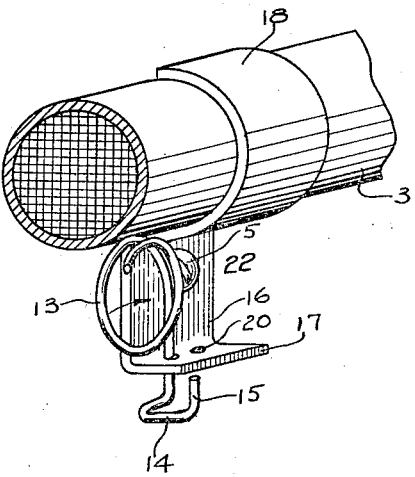
Figure 7:
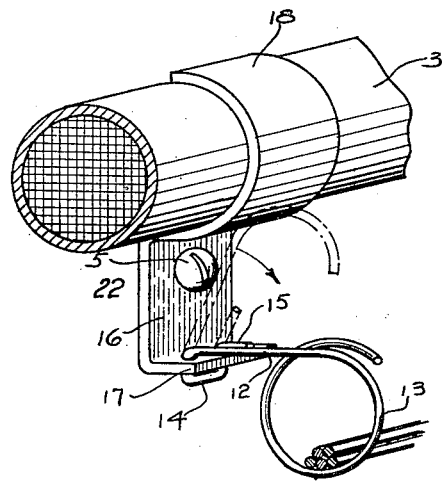

Fg. 6 is a perspective view, similar to Figs. 4 and 5, showing the third position of threading the bridle ring through the non-alined holes;

Fig. 7 is a perspective view, similar to Figs. 4, 5 and 6, and showing in dotted lines, the fourth position of threading the bridle ring, and in full lines the fifth and last position.

Figure 8:
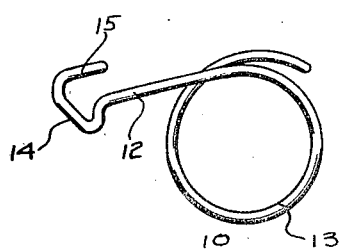

Fig. 8 is a perspective view of the preferred form of bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or subcombination, and then later, when the needs of the service demand it, my bridle ring may be supported by the same conduit or cable clamp, when the complete combination would be used.

In my invention I form my conduit or cable clamp 1 with a hook portion 2 to engage and support the conduit or cable 3 on the wall or other suitable support 4 by means of the securing screw 5, which passes through the base 6 of the clamp. I provide my conduit or cable clamp with a supporting member having non-alined openings to coöperate with attaching means on the bridle ring which means bear both on the upper and lower surfaces of said supporting member. For cheapness and ease of manufacture, I preferably, though not necessarily, form my supporting member 7 in the form of an integral flange on the base 6.

In Figs. 1 and 2, I provide this flange or supporting member with a slot 8, open to the side of the flange, and with a non-alined hole 9.

In the commercial use of my invention the clamp would ordinarily first be used as shown in Fig. 1. Whenever the traffic load upon the telephone or telegraph cable 3 becomes excessive and the telephone or telegraph engineers desire to increase the capacity of the installation, this can be readily done by threading my bridle ring 10 through the slot 8 and hole 9, so that the runs of bridle wires 11, 11 may be supported by the same conduit or cable clamp 1 without loosening the screw 5.

This bridle ring is provided with a shank 12, and a spiral or pigtail 13 for the reception of the bridle wires 11. The other end of the bridle ring is bent down to form a U-shaped hook 14 which extends beneath the plane of the shank 12. The end of the wire forming the hook is brought up and extends a short distance parallel with the shank 12 forming an arm 15.

To position the bridle ring, in this form of my invention, it is merely necessary to thread the shank 12 through the slot 8, the U-shaped hook 14 being brought a sufficient distance below the supporting member or flange 7, so that the arm 15 of the hook will be brought under and in line with the hole 9. By then pressing up on the spiral or pigtail portion 13 the shank 12 is caused to slide within the slot 8 and at the same time the arm 15 is threaded through the hole 9 until the parts assume the position shown in dotted lines in Fig. 2. By then pulling down sharply upon the pigtail or spiral 13 the entire bridle ring is rocked in the slot 8 and hole 9 so that it will assume the position shown in full lines in Fig. 2, the U-shaped member 14 bearing on the lower surface of the flange 7 while the arm 15 and a portion of the shank 12 bear upon the upper surface of the flange 7. This gives a very firm and secure fastening between the bridle ring and the clamp, but one which can be readily disconnected by reversing the operation above described.

In some cases I may employ a supporting member 17 in the form of a flange upon the base 16 of the conduit or cable clamp 22 shown in Figs. 3, 4, 5, 6 and 7. This clamp is provided with a hook portion 18 to support the conduit or cable 3, and is in all respects similar to the conduit or cable clamp shown in Figs. 1 and 2, except that no slot is used in the flange 17. Instead there are two separate and distinct non-alined holes 19 and 20.

The same bridle ring may be used with this form of my invention as the form illustrated in Figs. 1 and 2.

To attach the bridle ring 10 the arm 15 is threaded downward through the hole 19 as shown in Fig. 4. The entire bridle ring is then rotated in the hole 19, 180° until the arm 15 lies above the plane of the flange 17 and assumes the position shown in Fig. 5. The bridle ring is then swung substantially 90° and lowered slightly by permitting the shank 12 to slide in the hole 19 so that the parts will assume the position shown in Fig. 6. The bridle ring is then raised bringing the end of the arm 15 in line with the hole 20 and threading said arm 15 through the hole 20 as shown in dotted lines in Fig. 7. By then pulling down on the pigtail or spiral 13 the parts assume the position shown in full lines in Fig. 7 in which the member 14 bears upon the under surface of the flange or supporting member 17 while a portion of the shank 12 and the arm 15 bears upon the upper portion of said flange 17.

The actual operation of attaching the bridle ring to the non-alined holes 19 and 20 is done by simple manipulation and in much quicker time than the operation can be described.

The bridle ring can be detached from the flange 17 by simply reversing the operation above described.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a conduit or cable clamp having a hook portion to support a conduit or cable and a base to lie against a wall or other suitable support, the base being provided with a flange having a plurality of non-alined openings, and a bridle ring having means to be threaded through said non-alined openings and bear on both the upper and lower surfaces of the flange to secure the bridle ring to the clamp.

2. The combination of a conduit or cable clamp having a hook portion to support a conduit or cable and a base to lie against a wall or other suitable support, the base being provided with a flange having a slot open on the end and a non-alined hole, and a bridle ring having means to be threaded through said slot and non-alined hole and bear on both the upper and lower surfaces of the flange to secure the bridle ring to the clamp.

3. A new article of manufacture comprising a bridle ring having a U-shaped hook adapted to be threaded through non-alined openings in a supporting member carried by a conduit or cable clamp and bear on both the upper and lower surfaces of said supporting member.

JOHN KARITZKY.

Witnesses:
F. W. KARITZKY,
BERNARD C. KRANS.